(12) United States Patent
Nijim et al.

(10) Patent No.: US 9,959,349 B1
(45) Date of Patent: May 1, 2018

(54) CONTENT GUIDE AND/OR CONTENT CHANNELS TO PROVIDE TRENDING CONTENT ASSOCIATED WITH SOCIAL MEDIA

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 241 days.

(21) Appl. No.: 14/265,644

(22) Filed: Apr. 30, 2014

(51) Int. Cl.
*G06F 7/02* (2006.01)
*G06F 17/30* (2006.01)

(52) U.S. Cl.
CPC .. *G06F 17/30867* (2013.01); *G06F 17/30554* (2013.01); *G06F 17/30699* (2013.01); *G06F 17/30781* (2013.01); *G06F 17/30817* (2013.01); *G06F 17/30864* (2013.01)

(58) Field of Classification Search
CPC ......... G06F 17/30867; G06F 17/30554; G06F 17/30699; G06F 17/30864; G06F 17/30; G06F 17/30781; G06F 17/30817
See application file for complete search history.

(56) References Cited

U.S. PATENT DOCUMENTS

| | | | |
|---|---|---|---|
| 2008/0040474 A1* | 2/2008 | Zuckerberg | G06Q 30/02 709/224 |
| 2008/0294607 A1* | 11/2008 | Partovi | G06Q 30/00 |
| 2012/0005224 A1* | 1/2012 | Ahrens | G06Q 10/10 707/769 |
| 2012/0191715 A1* | 7/2012 | Ruffner | G06F 17/30011 707/738 |
| 2014/0143228 A1* | 5/2014 | Blue | G06F 17/30867 707/709 |
| 2014/0351839 A1* | 11/2014 | Narasimhan | H04H 20/38 725/14 |
| 2015/0058758 A1* | 2/2015 | Tseng | H04L 51/32 715/758 |
| 2015/0074131 A1* | 3/2015 | Fernandez | G06F 17/30029 707/758 |
| 2015/0074552 A1* | 3/2015 | Chai | H04N 21/482 715/753 |
| 2015/0095460 A1* | 4/2015 | Berger | H04L 67/06 709/219 |
| 2015/0121431 A1* | 4/2015 | Jacoby | H04N 21/251 725/59 |
| 2015/0149539 A1* | 5/2015 | Shukla | H04L 67/22 709/204 |

(Continued)

*Primary Examiner* — Bruce M Moser
(74) *Attorney, Agent, or Firm* — Merchant & Gould

(57) ABSTRACT

Trending content items from the user's social network(s) are provided in the form of one or more channel(s) or a guide. Various social networks of the user may be analyzed and the trending content may identified and sorted based on one or more of popularity, availability, etc. The trending content items may be updated automatically and/or dynamically to reflect any changes in trends based on spikes in discussions, like/dislike feedback, etc. The trending content items may be personalized based on the user's social networks and may differ for various user profiles within the same household.

19 Claims, 12 Drawing Sheets

(56) References Cited

U.S. PATENT DOCUMENTS

| | | | | |
|---|---|---|---|---|
| 2015/0234844 A1* | 8/2015 | Cardonha | ......... | G06F 17/30867 |
| | | | | 707/752 |
| 2015/0242518 A1* | 8/2015 | Rosenbaum | ...... | G06F 17/30867 |
| | | | | 707/710 |
| 2015/0310018 A1* | 10/2015 | Fan | ......................... | G06F 17/30 |
| | | | | 707/734 |
| 2015/0317398 A1* | 11/2015 | Phillips | ............. | G06F 17/30867 |
| | | | | 707/734 |
| 2016/0350432 A1* | 12/2016 | Graham | ............ | G06F 17/30241 |
| 2017/0013312 A1* | 1/2017 | Salomons | .......... | H04N 21/4331 |

\* cited by examiner

CONTENT GUIDE AND/OR CONTENT CHANNELS TO PROVIDE TRENDING CONTENT ASSOCIATED WITH SOCIAL MEDIA

BACKGROUND

Video consumers today have many options of available content. Customers of cable multiple systems operators (MSOs), telephone companies (telcos), and satellite video providers may typically be provided with hundreds of channels of linear content and thousands of pre-recorded "on-demand" movies and television shows to watch. Simply choosing what to watch has become a chore for many people, and the refrain of "hundreds of channels but nothing to watch" is commonly heard in news articles. Various video service providers have attempted deploying recommendation engines which either assemble lists of shows that the service providers think a particular user might like or service providers may mark items in an on-screen guide to show content items that might be of particular interest. Although these systems may help viewers to an extent, they may still be directed to content that the user may already have experienced, leading to monotonous viewing.

SUMMARY

Oftentimes viewers socialize with their contacts (peers, colleagues, friends etc.) about popular video content in a variety of different fields such as politics, technology, science, kids, etc. Providing consumers with various options of video content that may be trending in general, may be desired and prove extremely valuable, when they become involved in discussions.

Embodiments may be utilized to create one or more channel(s), or a guide that may be unique and dynamic, personalized for an individual user, based on various social networks associated with the user. The association may be made from the user's proactive selection of the social network(s) which the user may belong to or may just be interested in. It may be appreciated that the association may also be done by the system without any input from the user based on the user's demographic profile. In instances where the user's individual demographic profile may not be available, the system may be operable to associate the social networks based on the primary subscription account data.

The associated social networks may then be analyzed and trending content item may be identified and sorted based on popularity, availability, etc. For example, popularity may be measured via various algorithms including parameters such as number of views, comments, tweets, likes, thumbs up, rating, speed at which the popularity increases, etc. The trending content items may be updated automatically and/or dynamically to reflect any changes in trends based on spikes in discussions, like/dislike feedback, etc. The trending content items may be personalized based on the user's social networks and may differ for various user profiles within the household.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF DRAWINGS

Referring now to the drawings in which like reference numbers represent corresponding parts throughout.

DETAILED DESCRIPTION

Figure 1A:
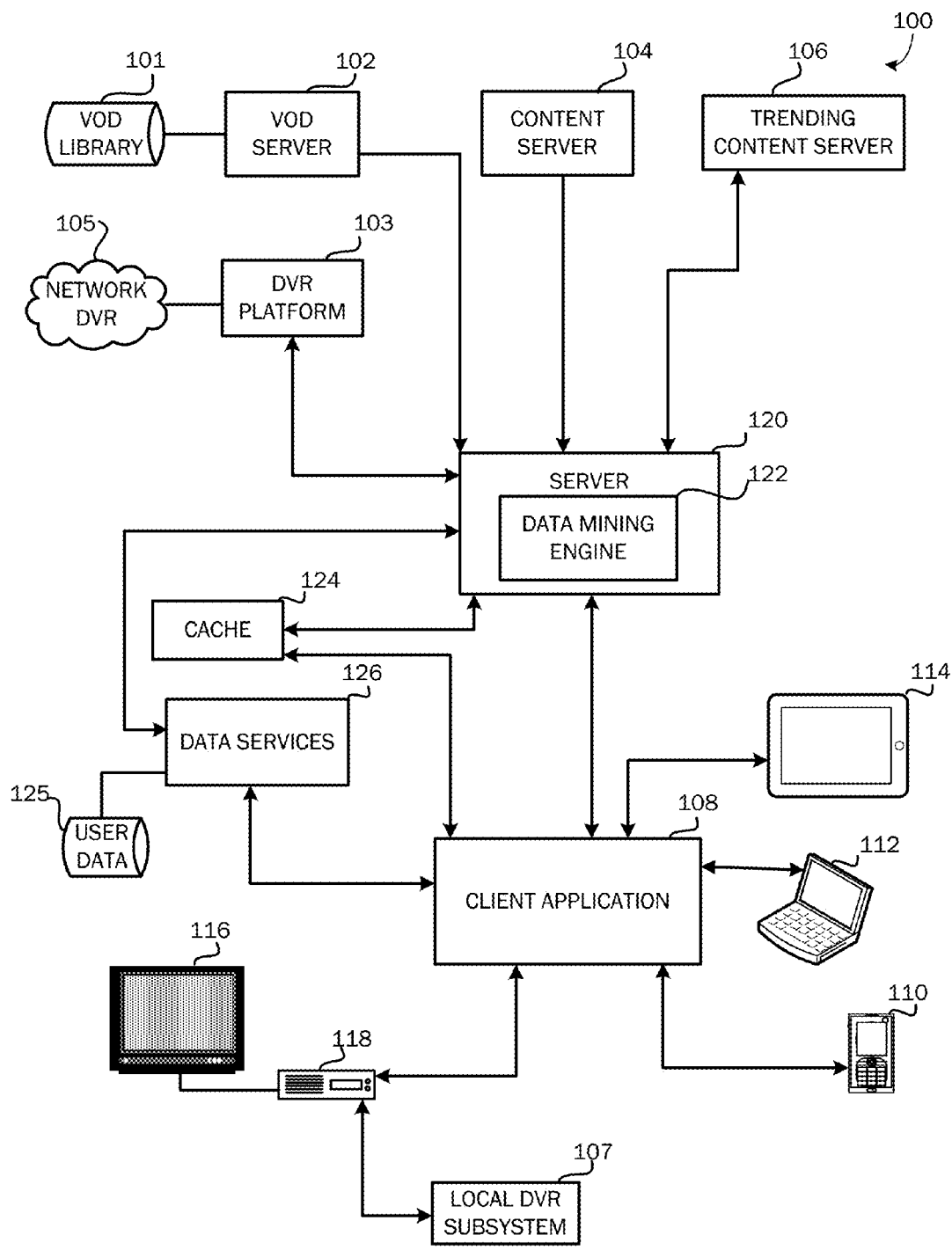
FIG. 1A is a block diagram illustrating a system for creating a content guide and/or content channels to provide trending content associated with social media.

As briefly described above, embodiments of the present invention may be utilized to present a user with personalized trending content items from the associated social network(s). According to an embodiment, the user may provide the system with the information regarding his/her various social networks in order to receive the various trending items. For example, there may be a number of television (TV) shows that may be very popular on a particular social network. The popularity may be measured by one or more algorithms including parameters such as number of views, comments, tweets, likes, thumbs up, rating, speed at which the popularity increases, etc. Embodiments allow for the system to prioritize the shows based on one or more parameters and make them available to the user based on business rules, time, date, period length of their availability, etc. The user can get access the trending TV shows without having to manually search for the trending TV shows, look for the channels that may be offered and then view them which immensely improves user experience.

According to another embodiment, even if a user may not be a part of a social network and may not have proactively selected the social networks to be associated, the system may be operable to associate social networks and provide trending content items simply based on the user demographics. It may be appreciated that in cases where the user profiles may not be available or created by the user the trending content items may still be made available based on the primary user subscription account.

These embodiments may be combined, other embodiments may be utilized, and structural changes may be made without departing from the spirit or scope of the present invention.

Referring now to the drawings, in which like numerals refer to like elements throughout the several figures, embodiments of the present invention and an exemplary operating environment will be described.

FIG. 1A is a simplified block diagram of a system 100 for providing a content guide and/or content channels to provide trending content associated with social media, according to an embodiment. Components of the system 100 may operate as a distributed system where each component is accessed via a suitable network, or the components may operate together as an integrated system. As illustrated, content server 104, network digital video recorder (DVR) platform 103, local DVR subsystem 107, video on demand VoD server 102 and trending content server 106 may be provided. Content server 104 may include video content data and metadata available via a service provider, such as a cable television (CATV) services system (as illustrated and described below with reference to FIG. 7), satellite television provider, or a provider on the Internet such as YouTube®, Hulu®, etc. The data and metadata may include information such as video content title, storyline, cast, genre, rating, release date, images, etc.

Trending content server 106 may comprise data and metadata related to the user's associated social networks and the content items that may be trending on those networks. According to an embodiment, the social networks information that may be present in the trending content server 106 may also include those social networks which the user may be interested in, but may not be a member of the social network.

Network DVR platform 103 may comprise various DVR recordings or pointers to various DVR recordings recorded on a network DVR 105 that may be available for viewing to the user. DVR recordings may also be stored locally via a local DVR subsystem 107 connected to a set-top box 118 in communication with a television set 116.

VoD server 102 may provide access to various VoD content items, stored either within the VoD library 101 maintained by the content provider, or the VoD content that may be available via the Internet. VoD server 102, network DVR platform 103, trending content server 106, and content server 104 may be provided to a server 120, where a data mining engine 122 may be operable to analyze the data and metadata from the trending content server 106 in relation to the user subscription data to provide the trending content items available to the user based on user subscription, viewing device, location, time of the day, etc.

The associated channel/guide/content/contacts data may be cached. The cache 124 is illustrated in FIG. 1A as a remote element, but may be integrated with the server 120 or the client application 108. As new information becomes available, the associated channel/guide/content/contacts data may be updated in the cache 124.

The system 100 may include a data services system 126, which may comprise such information as billing data, permissions and authorization data, user profile data, etc., and its data may be stored in a user database 125. The data services system 126 may be accessed by the data mining engine 122 for checking permissions, subscriptions, and profile data.

As illustrated in FIG. 1A, various endpoint devices may be utilized to access trending video content items. For example, endpoint devices may include, but are not limited to, a mobile communication device 110, such as a mobile phone, a computing device 112, such as a desktop computer, a laptop computer, etc., a wireless computing device, such as a tablet computing device 114, a television set 116, such as an Internet-connected television or a television connected to a network-connected device, such as a set top box (STB) 118. An endpoint device 110,112,114,116 may be utilized to access a client application 108.

The client application 108 may be operable to receive information regarding the user profile, viewing device, viewing location, viewing time of the day and provide it to the server 120 wherein the data mining engine 122 may be operable to analyze the information received from the client application 108 in relation with the various social networks that may be associated to the user profile in the trending content server 106, etc. The client application 108 may then be able to present the trending content items to the user in the form of a guide or one or more channel(s). According to embodiments, if the user's viewing device may not have the capability to view a certain trending content item, the client application 108 may be operable to provide an option to record, providing the user with the availability to record and view the same when the user may be able to consume the recorded trending content item via a device in communication with the set top box 118 with capabilities to present the content.

A designated button or other selectable control on a remote control or other suitable hard or soft key selection device may also be used to access the trending content items. A secondary screen companion device such as a tablet or other hand held computing device with an associated content provision application may also be used to allow the user to access the trending content items that may be displayed on the viewing screen such as the television set 116. Other suitable means for accessing the trending content guide/channel includes touch command, voice command, gesture command and combinations of various functionality interface methods and systems.

The associated channel/guide/content data may be stored in a cache 124 located on the server 120, on the application 108, or may be located remotely and accessed via a network.

Figure 1B:
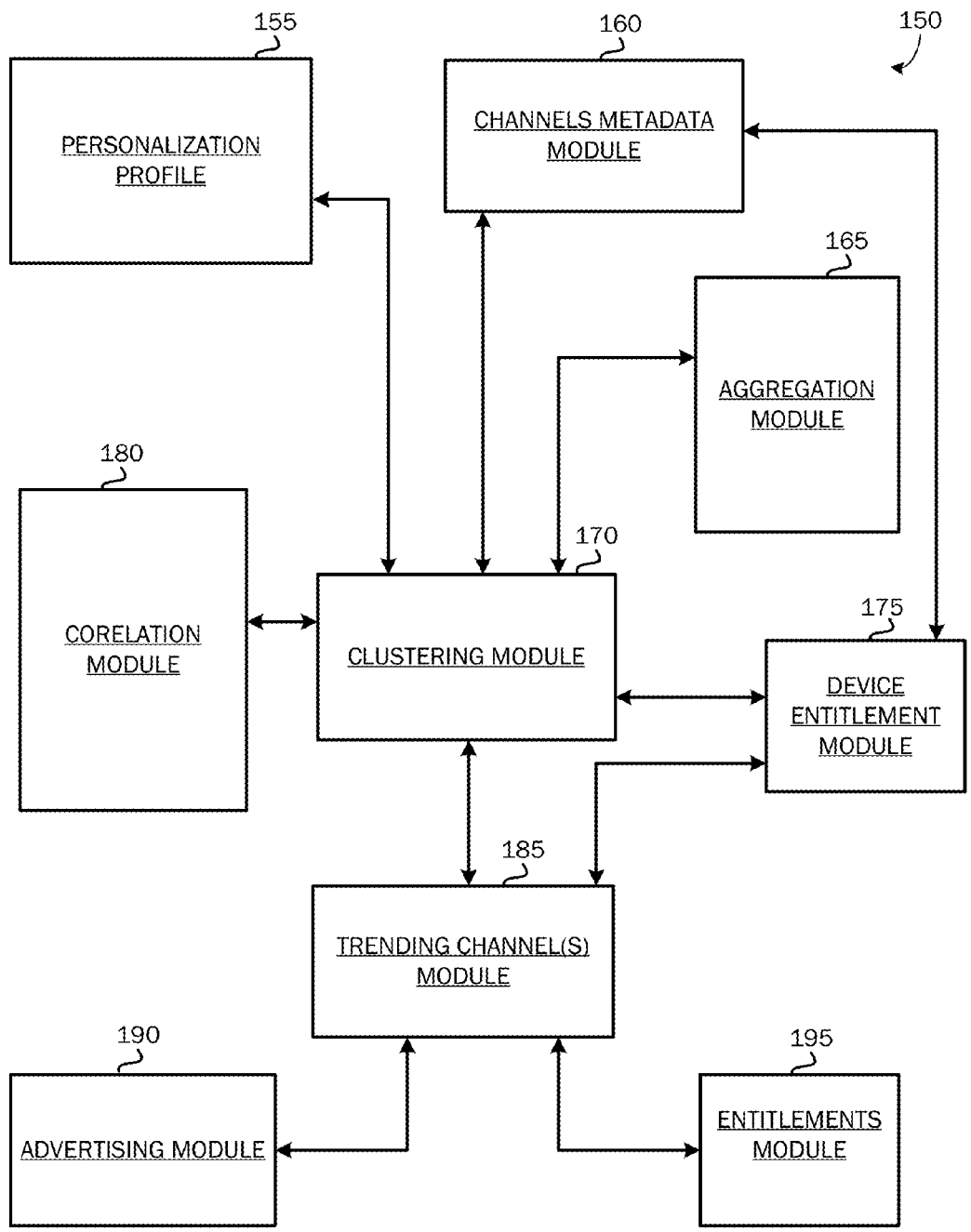
FIG. 1B is a block diagram illustrating example relationships between the various modules of a system for creating a content guide and/or content channels to provide trending content associated with social media, according to an embodiment.

FIG. 1B is a block diagram 150, illustrating example relationships between the various modules of a system for creating a content guide and/or content channels to provide trending content associated with social media, according to an embodiment. Personalization profile module 155 may include personalized profile data, registered devices, mapping data of the social network contacts, etc., of all the users of the subscribed household account. In one embodiment, a user may also be enabled to make configuration settings and manually modify recommendation engine settings, such that certain trending channel(s) are excluded from a particular content source.

Channels metadata module 160 may include metadata of the content items and data relating to content availability. For example, data regarding whether the content item is available via VoD, network DVR, local DVR, and/or via the Internet, time of availability etc. Aggregation module 165 may perform the function of searching and aggregating content items based on social media postings. Correlation module 180 may identify various other additional information, such as data received from the user's social network contacts, location of the viewing device, location of the subscribed household location, etc. and correlate them all to provide the data to the clustering module 170 where the collected data may be clustered and grouped according to local, regional or national markets. Data from the personalization profile module 155, channels metadata module 160, aggregation module 165 may also be provided to the clustering module 170. Data from the clustering module 170 may be provided to the trending channel(s) module 185 for aggregation and creation of real/virtual trending channel(s).

Device entitlement module 175 may perform the function of identifying the content item data based on devices. For example, some content items may not be presented on the tablet device due to restriction from the content owners, copyright restrictions etc.

Data from an advertising module 190, which may be responsible for performing the function of identifying and inserting ads; and from an entitlements module 195, which may check user entitlements may also be provided to the trending channel(s) module 185 for aggregation and creation of real/virtual trending channel(s).

According to embodiments the advertising module 190, pre-roll and post-roll advertising may be inserted while the trending content item is being provided to the viewing device. These ads may be inserted based on business rules/agreements, or to simply keep the viewer engaged during the presentation of the trending content in case if there may be any empty spots identified.

Figure 2A:
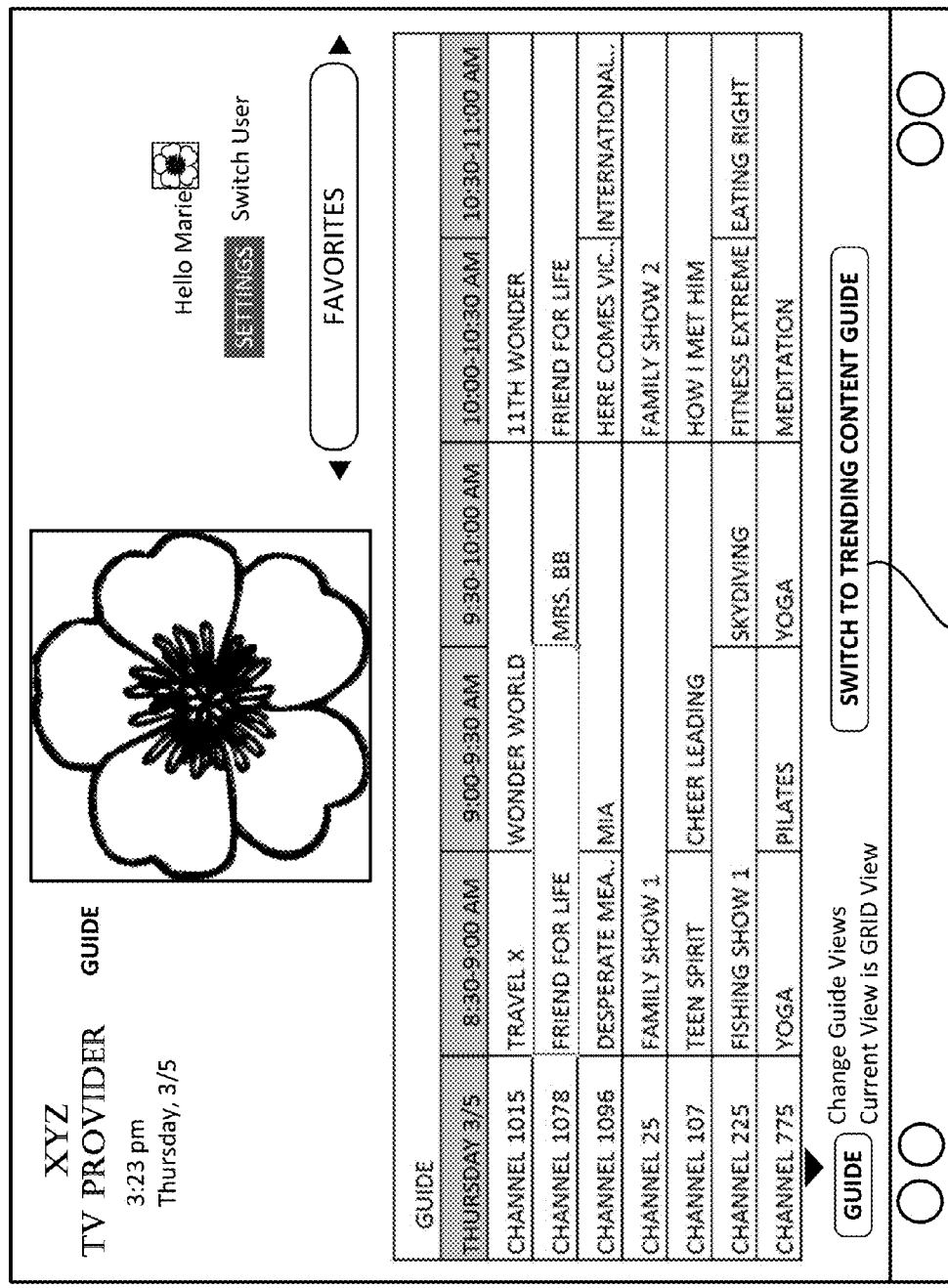
FIG. 2A is an illustration of a user-interface for providing an option to view the trending content items guide.

FIG. 2A is an illustration of a user-interface 200 for providing an option to view the trending content items guide. According to embodiments, the trending content may be made available in a variety of different ways. A selectable button 205 may be made available on the guide user-interface 200 as illustrated in FIG. 2A.

Figure 2B:
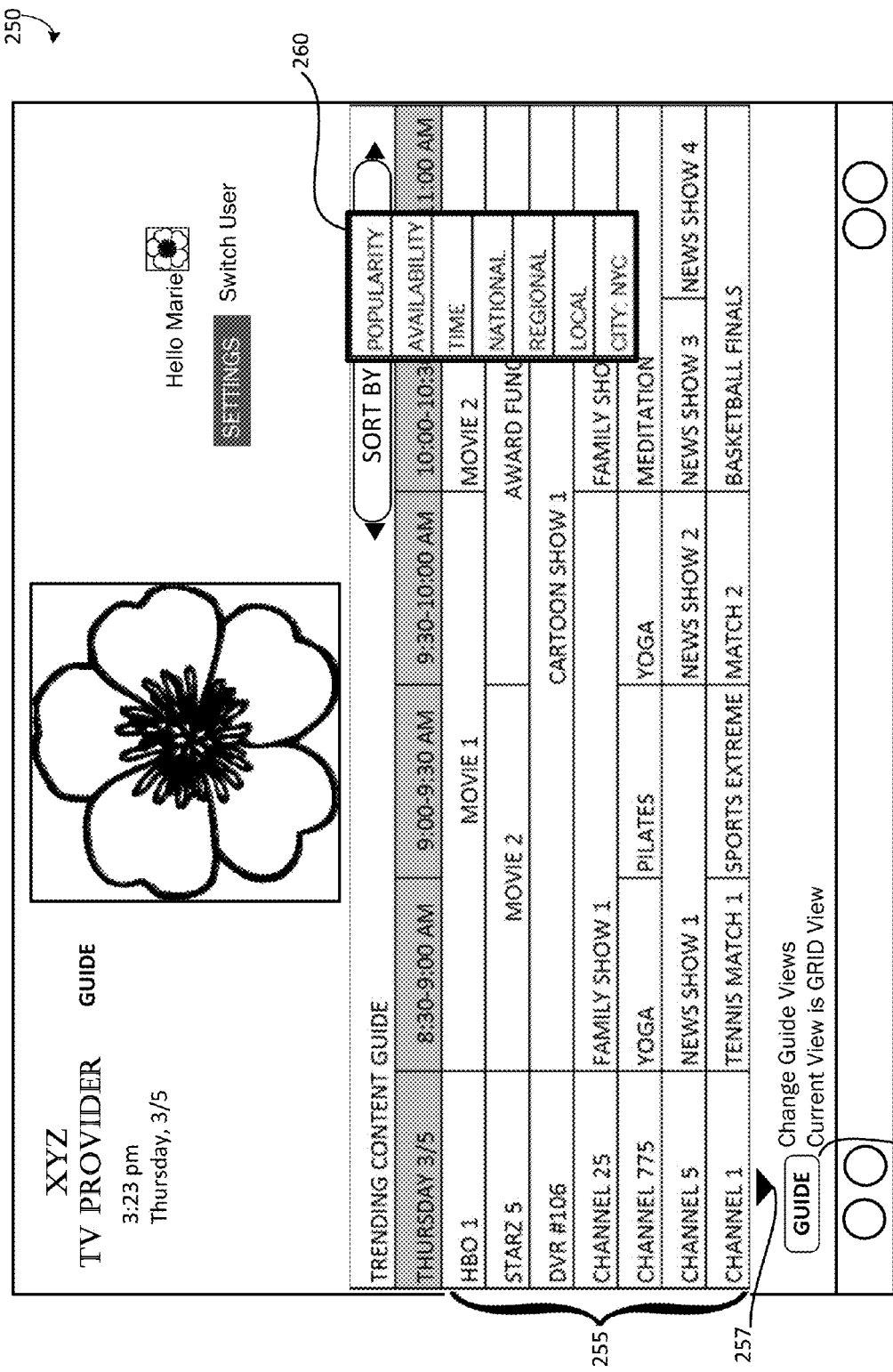
FIG. 2B is an illustration of an example trending content item guide wherein the content items trending in the user's associated social network(s) may be included.

Upon selection of the option 205, the trending content guide user interface 250 as illustrated in FIG. 2B, may be provided. The trending content guide user interface 250 may display trending content items list 255. The system may be operable to identify multiple content items that may be available at the same time. These trending content items may be sorted based on popularity, availability, time, national, regional, local, chosen city, etc., which may be customized by a selective option 260 as illustrated in FIG. 2B. The user may also be able to scroll down the list 255 using the option 257 to get to various other content items that may be trending in the same time slot which may all not be a part of the viewable screen space. According to an embodiment, the trending content items may be presented in a grid viewing format (as illustrated in FIG. 2B), mosaic format, list format, etc. According to an embodiment, popularity may also be measured by aggregating the trending content items from one or more third party providers.

As an example embodiment, with respect to sorting by popularity, a content item that may gain popularity at a relatively higher rate may also be considered as a parameter to decide the priority when displaying the trending content items in the applicable format. For example, if there are three content items A, B and C trending on Twitter® with 5,000 tweets, 7,000 tweets and 10,000 tweets, respectively, content item C may be at the top due to the highest number of tweets (10,000 tweets), content item B may be second and content item A may be third on the list of trending content items. In this example, the system may be operable to monitor in real time or at regular intervals based on business rules, the social media postings, number of tweets and identify if there is any change in popularity. In case if the number of tweets for content item B changes to 12000 tweets from 7000, then it may become first on the trending content item list (other tweets remaining relatively similar).

Further, if a content item X is in the trending content item list at number 10 due to 3,000 number of tweets at Twitter® which may be one of the user's social networks and a sudden popularity spike, such as the number of tweets reaching 11,000 in a relatively shorter span of time, then it may move to the first position in the trending content item list automatically, even if there may be content item B with 12000 tweets. In another embodiment, the availability of the trending content items may be dynamic in nature and may change as indicated by the user.

Figure 3A:
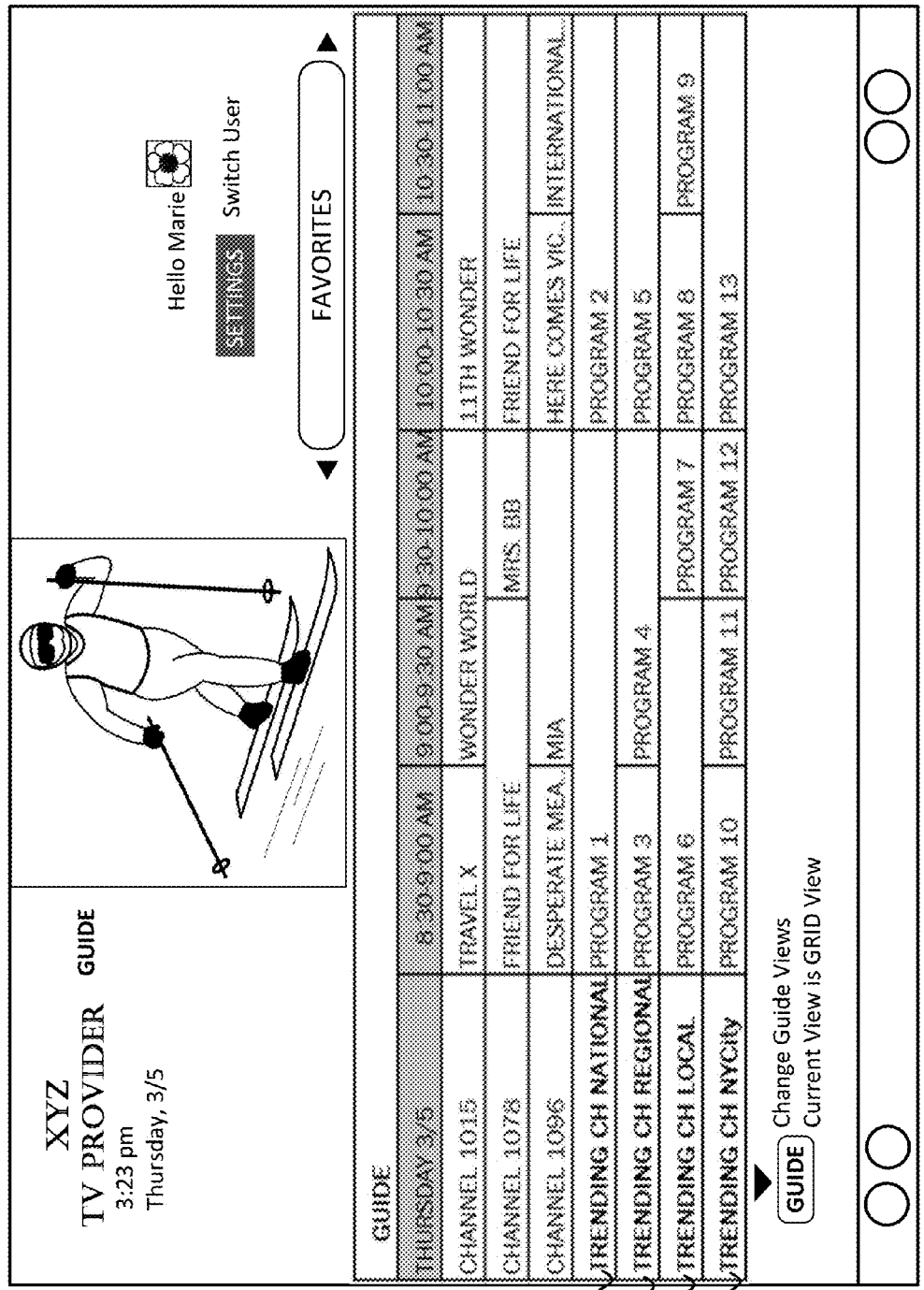
FIG. 3A is an illustration of a user-interface for providing the trending content items from the user's associated social network(s) in the form of one or more real/virtual channel(s)

FIG. 3A is an illustration of a user-interface 300 for providing the trending content items from the user's associated social network(s) in the form of one or more channel(s) 305, according to an embodiment. According to an embodiment, the service provider may search all the postings on the user's social networks, aggregate the data and cluster it for presenting various trending channels. The channels may be aggregated based on time, date, period length of their availability or a hybrid combination of the factors. The content displayed as trending in the form of one or more channel(s) 305 may present channels based on national level 305A, channels based on regional level 305B, channels based on local level 305C, and/or channels based on a chosen city 305D.

According to an embodiment, the trending channel may display the top trending content item at various time slots. For example, as illustrated in FIG. 3A, trending channel 305A, has the content item "PROGRAM 1" as the top trending content item in the 8:30 A.M. to 10 A.M. time slot and trending channel 305B, has the content item "PROGRAM 3" as the top trending content item in the 10 A.M. to 11 A.M. timeslot.

Figure 3B:
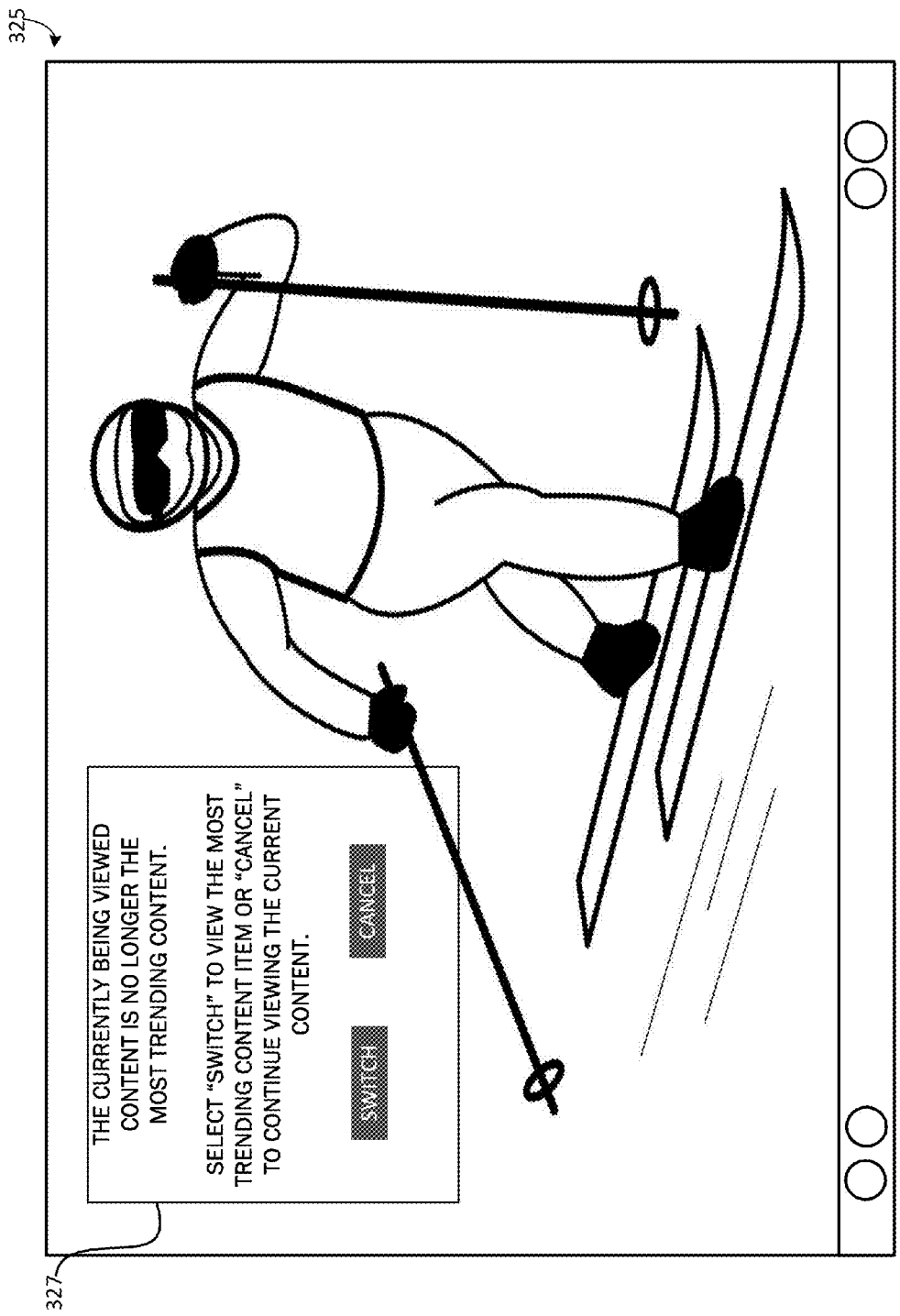
FIG. 3B is an illustration of a user-interface for providing an indication to the user of the change in the list of the trending content items from the user's associated social network(s)

Also, according to an embodiment, if the trending content items change, while they are being presented on the viewing device, an indication may be provided to the user via a popup 327 in the user-interface 325. As illustrated in FIG. 3B, a popup is presented that indicates that the current content item is no longer the most popular trending content item. The popup provides a selective option for the user to switch to the most trending content item or continue viewing the currently presented trending content item.

Figure 3C:
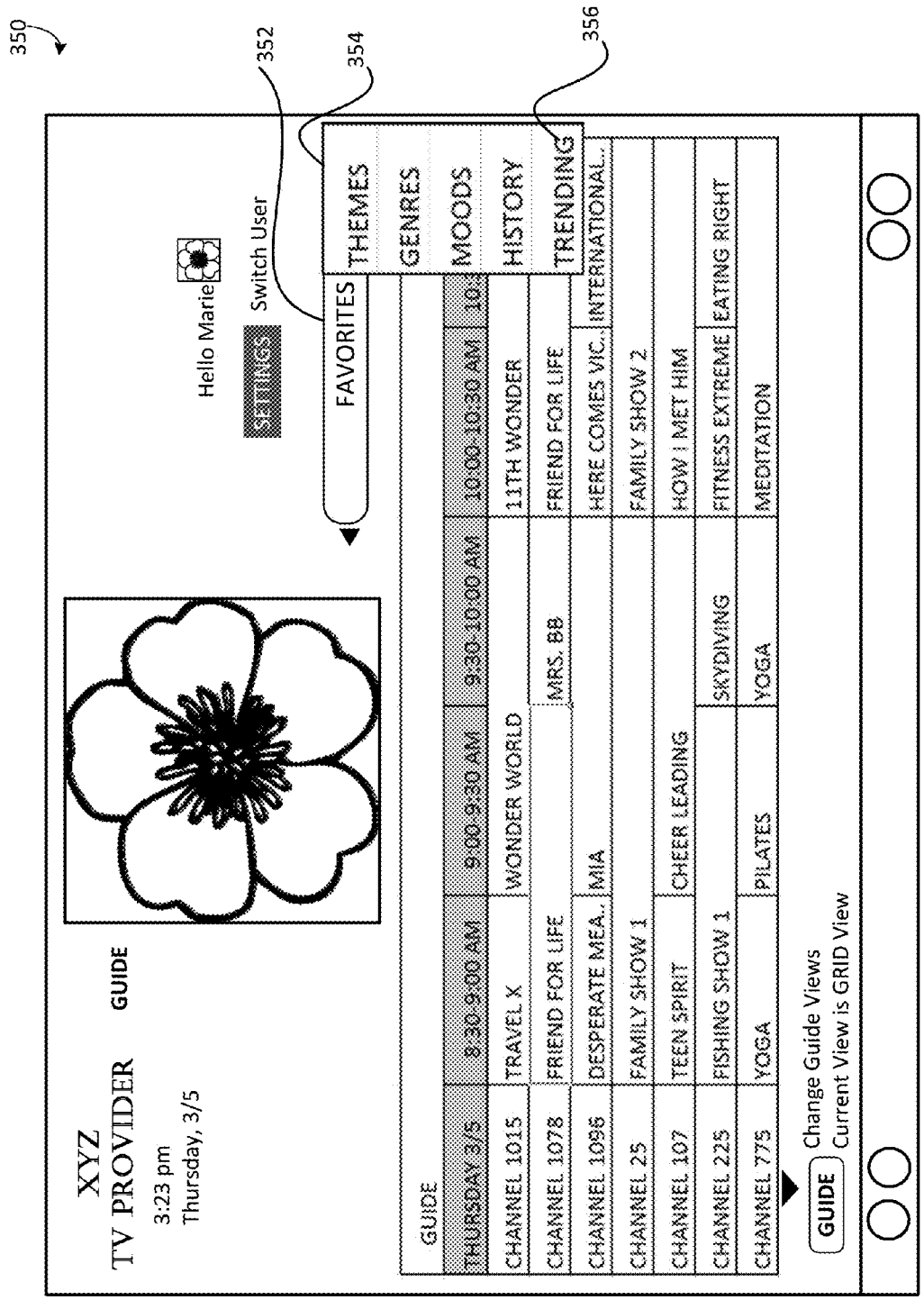
FIG. 3C is an illustration of a user-interface for providing an option to view the trending content items from the user's associated social network(s) in the form of a guide or one or more real/virtual channel(s) from a viewing option menu.

FIG. 3C is an illustration of a user-interface 350 for providing an option 356 to view the trending content items from the user's associated social network(s) in the form of a guide or one or more channel(s). Within the guide user interface, by selecting the option 352 via a touch, gesture, pressure, retina or mouse input, a list 354 may be provided with the selective option 356. The option 356 is provided as part of the list 354 of the variety of different types of content that may be available to the user. The selection of the option 356 may present the trending guide user interface 250 as illustrated in FIG. 2B, or as one or more trending channels 305 as illustrated in FIG. 3A.

Figure 3D:
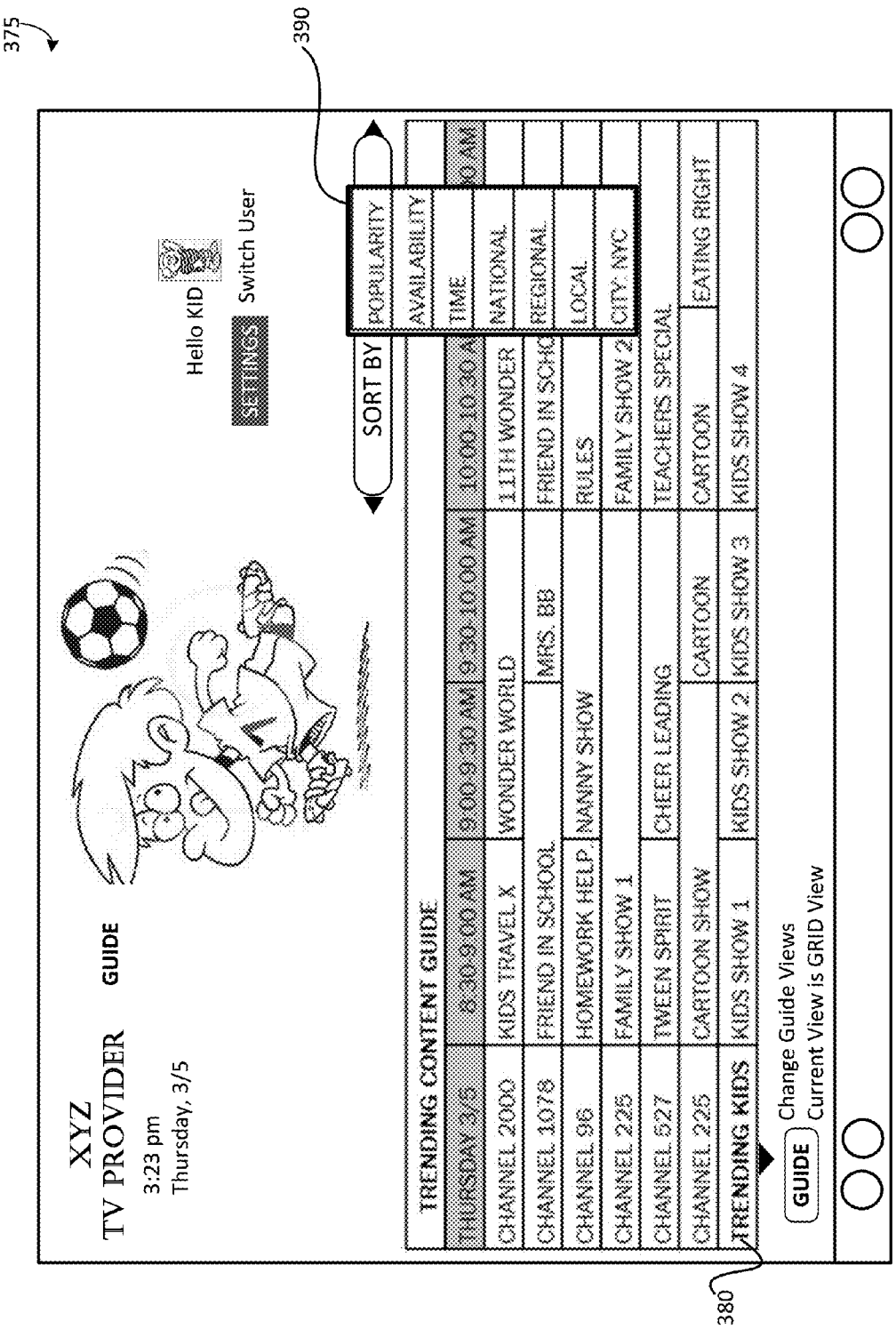
FIG. 3D is an illustration of a user-interface for providing the trending content items to a kids profile with parental controls, from the young profile user's associated social network(s) in the form of a guide or one or more real/virtual channel(s)

FIG. 3D is an illustration of a user-interface 375 for providing the trending content items in the form of a guide or one or more channel(s) 380 based on a young user's profile associated social network(s), which has a rating or source that is approved by parental controls. The channels may be aggregated based on time, date, period length of their availability, popularity, national, regional, local, chosen city or a hybrid combination of the factors. The content items that that are included may be available in linear format, DVR, VoD, Internet content, etc. The system may be operable to check if a parental control has been set for the user's profile or has been provided by the parent. Content items, to be included in the trending content guide for the kid's user profile, are then analyzed based on the data and a personalized trending content guide may be presented, which may be customized by a selective option 390 as illustrated in FIG. 3D.

Figure 4:
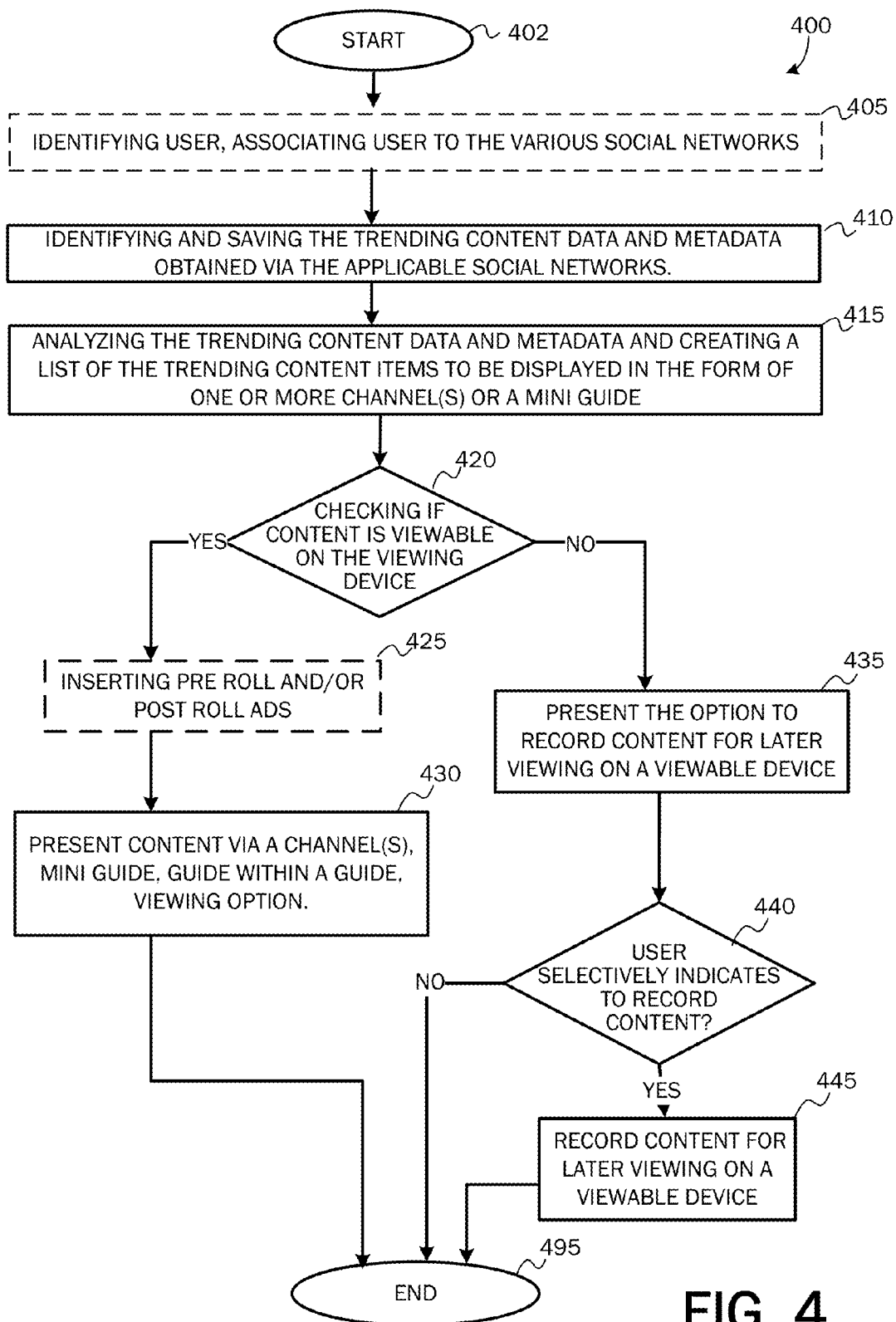
FIG. 4 is a flow chart of a method for creating a guide or one or more real/virtual channel(s) including the trending content items from the user's associated social network(s), according to an embodiment.

FIG. 4 is a flow chart of a method 400 for creating a content guide and/or content channels to provide trending content associated with social media, according to an embodiment. The method 400 starts at OPERATION 402 and proceeds to an optional OPERATION 405, where the user may be identified and associated with the applicable social networks. According to embodiments, the social networks may either be added by the user or may be associated based on the location, demographic profile, etc. The method 400 may then proceed to OPERATION 410 where the trending content data and metadata from the social networks associated with the user profile may be identified and saved. The saved trending content data and metadata is analyzed and a list of the trending content items may be created to be displayed in the form of a guide or one or more channel(s) from the user's associated social network(s) at OPERATION 415.

The method 400 proceeds to DECISION OPERATION 420, where the trending content is further analyzed and a verified if it may be viewable on the user's viewing device. If, at DECISION OPERATION 420, a determination is made that the trending content may not be viewable on the user's current viewing device, the user may be given an option at OPERATION 435 to record the content for later viewing on a viewable device that may be in communication with the set top box 118. The method 400 may then proceed to another DECISION OPERATION 440, where the user may selectively indicate the desire to record the trending content item. If at DECISION OPERATION 440, an indication is received to record the trending content item, then the method 400 proceeds to OPERATION 445 wherein the trending content item may be recorded for later viewing.

Whereas, if at DECISION OPERATION 420, a determination is made that the trending content may be viewable on the user's current viewing device, the trending content item(s) may be provided on the viewing device in the appropriate format at OPERATION 430. Prior to OPERATION 430, there may be an optional OPERATION 425, wherein, pre-roll or post-roll ads may be inserted based on business rules/agreements and/or to fill in the gaps in between the presentation of the trending content items, etc. in order to keep the user engaged.

The method may end at OPERATION 495.

Figure 5:
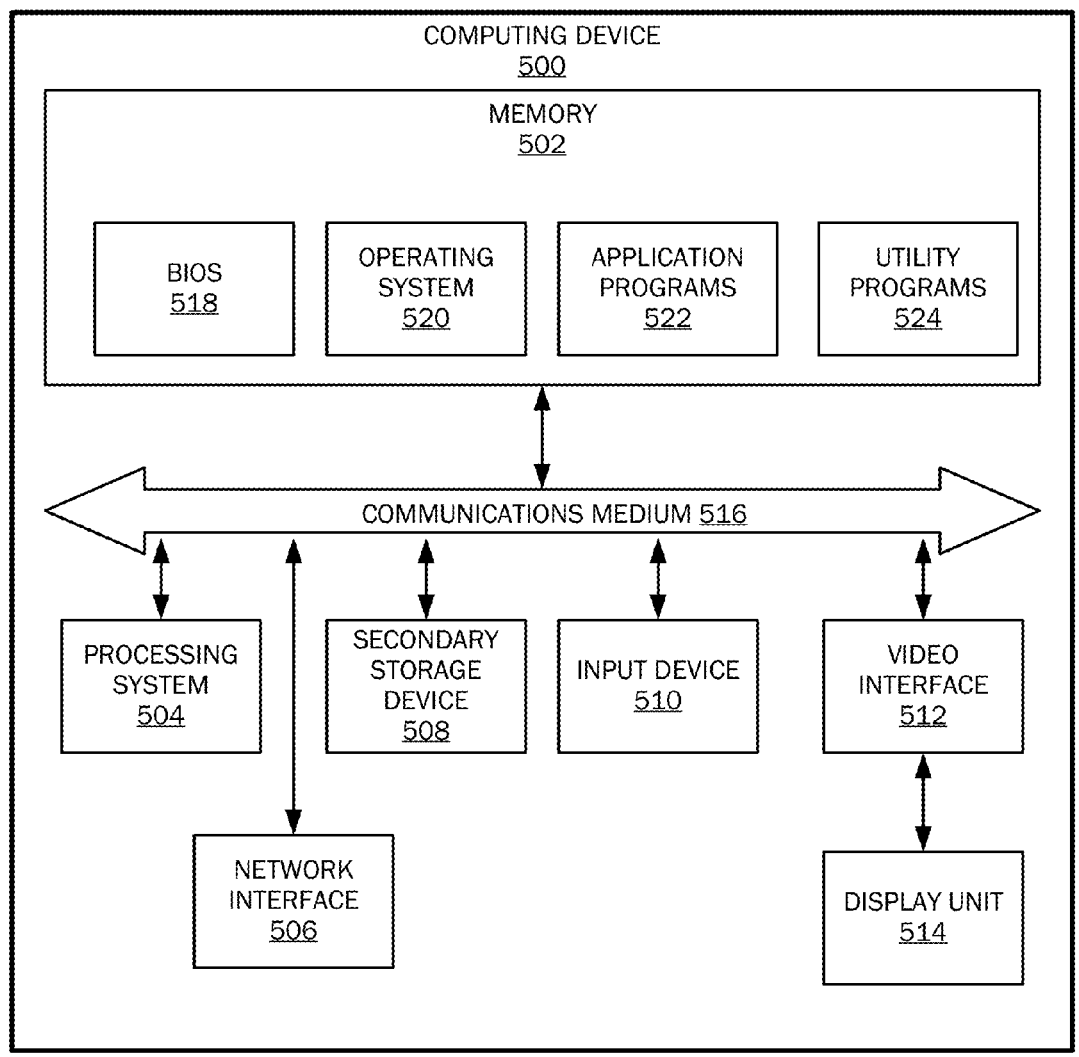
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the system 100 may be implemented using one or more computing devices like the computing device 500. It should be appreciated that in other embodiments, one or a combination of the components of the system 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, and a display unit 514. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. Memory 502 thus may store the computer-executable instructions that, when executed by processing system 504, provide a content guide and/or content channels to provide trending content associated with social media, as described above with reference to FIGS. 1-4.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media includes information delivery media. Computer-executable instructions, data structures, program modules may be embodied on a communications medium. For example, communication media can include wired media, such as a wired network or direct-wired connection, and wireless media, such as acoustic, radio frequency (RF), infrared, and other wireless media.

The term computer-readable storage medium refers only to devices and articles of manufacture that store data and/or computer-executable instructions readable by a computing device. Computer-readable storage medium do not include communications media. The term computer-readable storage media encompasses volatile and nonvolatile and removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a LCD display panel, a touch-sensitive display panel, a LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figure 6:
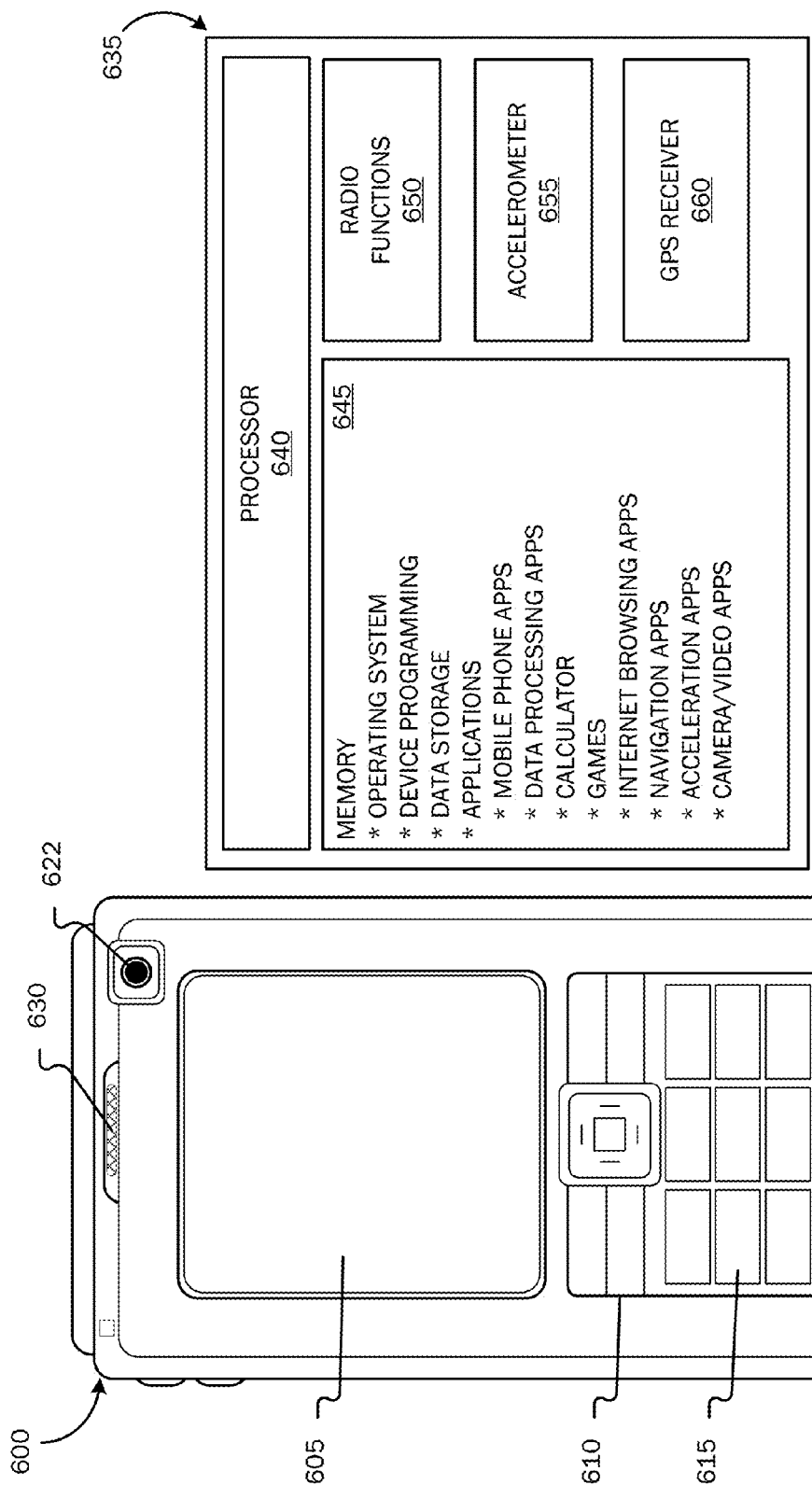
FIGS. 6A-6B illustrate a suitable mobile computing environment with which embodiments may be practiced.

FIGS. 6A-6B illustrate a suitable mobile computing environment, for example, a mobile computing device 600, a mobile phone/smartphone, a tablet device, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the mobile computing device 600 may be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 622 functionality associated with the mobile computing device, or any other suitable input means. Data may be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, application software to analyze trending content items from the user's associated social network(s) may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 may be utilized to communicate with a wireless or Wi-Fi based positioning system to determine a device's location.

Figure 7:
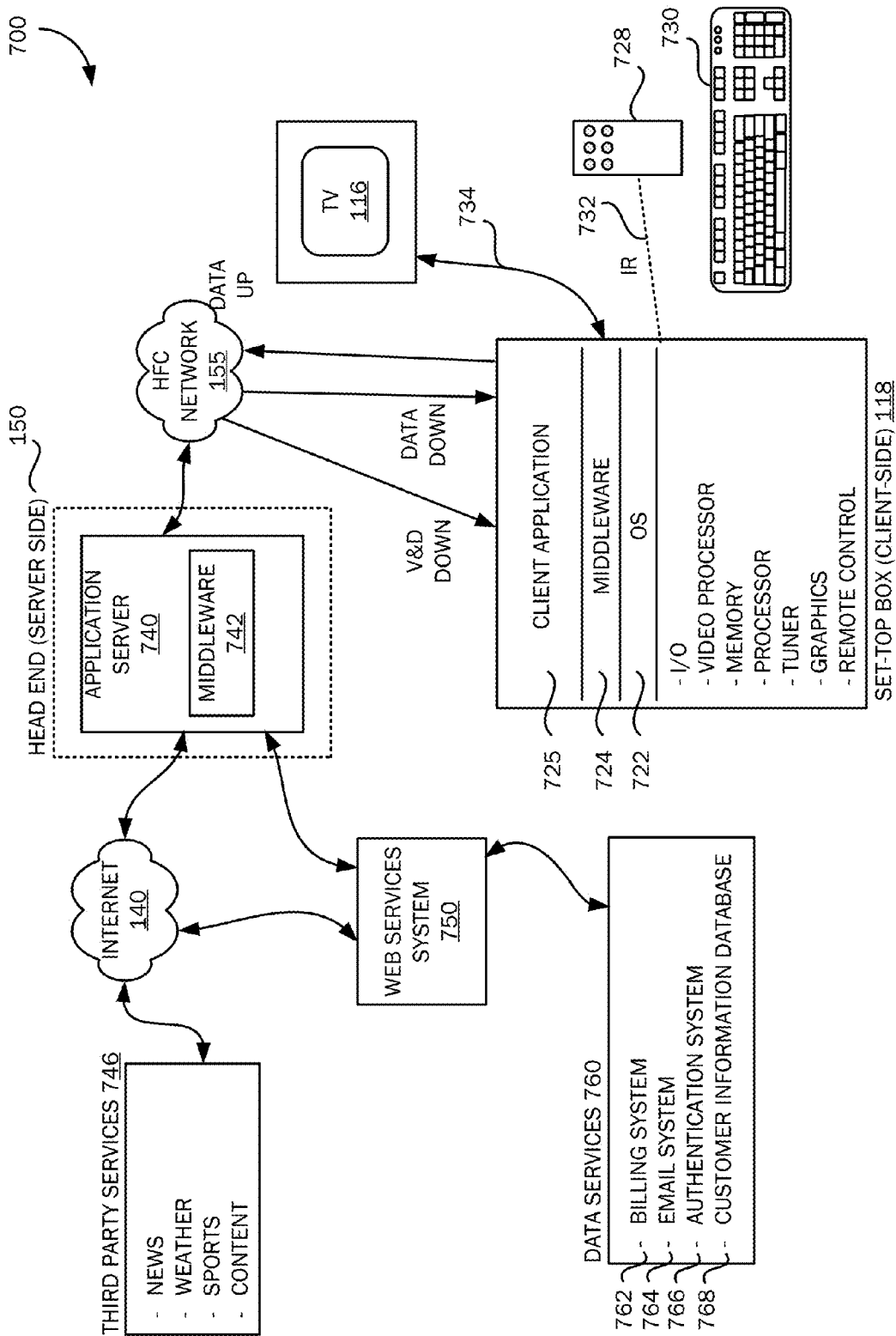
FIG. 7 is a block diagram illustrating a cable television services system architecture providing an operating environment according to an embodiment.

FIG. 7 is a simplified block diagram illustrating a cable television services system 700 (hereafter referred to as "CATV") architecture providing an operating environment according to an embodiment. As can be appreciated, CATV architecture is but one of various types of systems that may be utilized to provide substituted VoD content. Referring now to FIG. 7, digital and analog video programming, information content and interactive television services are provided via a hybrid fiber coax (HFC) network 155 to a television set 116 for consumption by a cable television/services system customer. As is known to those skilled in the art, HFC networks 155 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 155 allows for efficient bidirectional data flow between the client-side set-top box 118 and a server-side application server 740.

The CATV system 700 is in the form of a distributed client-server computing system for providing video and data flow across the HFC network 155 between server-side services providers (e.g., cable television/services providers) via a server-side head end 150 and a client-side customer via a client-side set-top box (STB) 118 in communication with a customer receiving device, such as the television set 116. As is understood by those skilled in the art, modern CATV systems 700 may provide a variety of services across the HFC network 155 including traditional digital and analog video programming, telephone services, high speed Internet access, video-on demand, and information services.

On the client side of the CATV system 700, digital and analog video programming and digital and analog data are provided to the customer television set 116 via the set-top box (STB) 118. Interactive television services that allow a customer to input data to the CATV system 700 likewise are provided by the STB 118. As illustrated in FIG. 7, the STB 118 is a multipurpose computing device having a computer processor, memory, and an input/output mechanism. The input/output mechanism receives input from server-side processes via the HFC network 155 and from customers via input devices such as the remote control device 728, keyboard 730, or other computing device, such as a tablet/slate computer 114, mobile computing device 600, etc. The remote control device 728 and the keyboard 730 may communicate with the STB 118 via a suitable communication transport such as the infrared connection 732. The STB 118 also includes a video processor for processing and providing digital and analog video signaling to the television set 116 via a cable communication transport 734. A multichannel tuner is provided for processing video and data to and from the STB 118 and the server-side head end system 150, described below.

The STB 118 also includes an operating system 722 for directing the functions of the STB 118 in conjunction with a variety of client applications 725. For example, if a client application 725 requires a news flash from a third-party news source to be displayed on the television set 116, the operating system 722 may cause the graphics functionality and video processor of the STB 118, for example, to output the news flash to the television set 116 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server-side of the CATV system 700 for facilitating communication between the server-side application server and the client-side STB 118. The middleware layer 742 of the server-side application server and the middleware layer 724 of the client-side STB 118 may format data passed between the client-side and server-side according to the Extensible Markup Language (XML).

According to one embodiment, the set-top box 118 passes digital and analog video and data signaling to the television set 116 via a one-way communication transport 734. According to other embodiments, two-way communication transports may be utilized, for example, via high definition multimedia (HDMI) ports. The STB 118 may receive video and data from the server-side of the CATV system 700 via the HFC network 155 through a video/data downlink and data via a data downlink. The STB 118 may transmit data from the client-side of the CATV system 700 to the server-side of the CATV system 700 via the HFC network 155 via one data uplink. The video/data downlink is an "in band" downlink that allows for digital and analog video and data signaling from the server-side of the CATV system 700 through the HFC network 155 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 155 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 740 is typically passed through the "out of band" data links. Alternatively, an "in band" data carousel may be positioned in an "in band" channel into which a data feed may be processed from the server-side application server 740 through the HFC network 155 to the client-side STB 118. Operation of data transport between components of the CATV system 700, described with reference to FIG. 7, is well known to those skilled in the art.

Referring still to FIG. 7, the head end 150 of the CATV system 700 is positioned on the server-side of the CATV system and includes hardware and software systems responsible for originating and managing content for distributing through the HFC network 155 to client-side STBs 118 for presentation to customers via television sets 116. As described above, a number of services may be provided by the CATV system 700, including digital and analog video programming, interactive television services, telephone services, video-on demand services, targeted advertising, and provision of information content.

The application server 740 is a general-purpose computing system operative to assemble and manage data sent to and received from the client-side set-top box 118 via the HFC network 155. As described above with reference to the set-top box 118, the application server 740 includes a middleware layer 742 for processing and preparing data from the head end of the CATV system 700 for receipt and use by the client-side set-top box 118. For example, the application server 740 via the middleware layer 742 may obtain data from third-party services 746 via the Internet 140 for transmitting to a customer through the HFC network 155 and the set-top box 118. For example, content metadata of a third-party content provider service may be downloaded by the application server 740 via the Internet 140. When the application server 740 receives the downloaded content metadata, the middleware layer 742 may be utilized to format the content metadata for receipt and use by the set-top box 118. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 118 through the HFC network 155 where the XML-formatted data may be utilized by a client application 725 in concert with the middleware layer 724 as described above. As should be appreciated by those skilled in the art, a variety of third-party services data, including news data, weather data, sports data and other information content may be obtained by the application server 740 via distributed computing environments such as the Internet 140 for provision to customers via the HFC network 155 and the set-top box 118.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method of creating a trending content channel of a trending content guide based on social media comprising:
   identifying a user;
   identifying social networks;
   identifying one or more trending content items within the social networks based on popularity, popularity being determined based at least in part on a number of views and aggregating trending content items from one or more third party providers;
   analyzing the trending content items in relation to the user;
   providing the trending content items that comprise trending television (TV) shows as part of the trending content channel of the trending content guide to a viewing device without having to manually search for the trending TV shows;
   providing an option to view the trending content guide that includes the trending content items;
   displaying the trending content guide with the trending content items comprising the trending television shows after selection of the option; and
   dynamically updating a priority of a trending content item of the trending content items based on an algorithm that includes a first parameter that corresponds to a speed at which the popularity increased for the trending content item as compared to other trending content items and a second parameter that corresponds to a number of tweets that reach a certain number in a relatively shorter span of time for the trending content item as compared to other trending content items including when the other trending content items have more tweets than the number of tweets associated with the trending content item.

2. The method of claim 1, further comprising:
   providing an indication as the trending content items change to indicate that the trending content item is no longer a most popular trending content item; and
   providing a selective option for the user to switch to the most popular trending content item.

3. The method of claim 1, wherein providing the trending content items to a viewing device includes providing the trending content items relating to a particular local area associated with the user.

4. The method of claim 1, wherein providing the trending content items to a viewing device includes providing the trending content items relating to a particular regional area associated with the user.

5. The method of claim 1, wherein providing the trending content items to a viewing device includes providing trending content items having a rating consistent with parental controls associated with the user.

6. The method of claim 1, prior to providing the trending content items to a viewing device:
   determining if the trending content items are viewable on the viewing device; and
   if one or more of the trending content items are not viewable on the viewing device, providing an option to record one or more of the trending content item for later viewing.

7. The method of claim 1, prior to providing the trending content items to the viewing device, inserting pre-roll or post roll advertising.

8. The method of claim 1, wherein providing the trending content items comprises providing the trending content items in the form of one or more of: a virtual channel, a real channel, a sub channel, a mini guide and a guide within a guide.

9. The method of claim 1, wherein analyzing the trending content items comprises analyzing the trending content items in relation to one or more or combination of time, date, and length of the trending content item.

10. The method of claim 1, wherein identifying social networks comprises identifying based on one or more of: a user input, a location, and a user profile.

11. The method of claim 1, wherein the popularity is further determined based on:
    a number of like comments;
    a number of dislike comments;
    a number of thumbs ups;
    a number of tweets;
    a number of followers;
    an aggregation result of the trending content from the one or more third party providers;
    a number of viewers; and
    a number of comments.

12. The method of claim 1, wherein the trending content items comprise one or more of: a linear television content item, a video content item available on an internal channel, a digital video recorder content item, and a video on demand content item.

13. A system to create a trending content channel of a trending content guide based on social media comprising:
    a memory storage; and
    one or more processing units coupled to the memory storage, wherein the one or more processing units are operable to:
    identify a user;
    identify social networks associated with the user;
    identify one or more trending content items within the social networks based on popularity, popularity being determined based at least in part on a number of views and aggregating trending content items from one or more third party providers;
    analyze the trending content items in relation to the user;
    provide the trending content items that comprise trending TV shows as part of the trending content channel of the trending content guide to a viewing device without having to manually search for the trending TV shows;
    provide an option to view the trending content guide that includes the trending content items;
    display the trending content guide with the trending content items comprising the trending television shows after selection of the option; and
    dynamically update a priority of a trending content item of the trending content items based on an algorithm that includes a first parameter that corresponds to a speed at which the popularity increased for the trending content item as compared to other trending content items and a second parameter that corresponds to a number of tweets that reach a certain number in a relatively shorter span of time for the trending content item as compared to other trending content items including when the other trending content items have more tweets than the number of tweets associated with the trending content item.

14. The system of claim 13, wherein to provide the trending content items to a viewing device includes to provide the trending content items relating to a particular local area associated with the user.

15. The system of claim 13, wherein to analyze the trending content items comprises to analyze the trending content items in relation to one or more or combination of time, date, and length of the trending content item.

16. The system of claim 13, wherein to identify the social networks comprises to identify based on one or more of: a user input, a location, and a user profile.

17. A non-transitory computer readable medium containing computer executable instructions which when executed by a computer perform a method of creating a trending content channel of a trending content guide based on social media comprising:
- identifying a user;
- identifying social networks associated with the user;
- identifying one or more trending content items within the social networks, trending content items being determined based at least in part on a number of views and aggregating trending content items from one or more third party providers;
- analyzing the trending content items in relation to the user;
- providing the trending content items that comprise trending TV shows as part of the trending content channel of the trending content guide to a viewing device without having to manually search for the trending TV shows;
- providing an option to view the trending content guide that includes the trending content items;
- displaying the trending content guide with the trending content items comprising the trending television shows after selection of the option; and
- dynamically updating a priority of a trending content item of the trending content items based on an algorithm that includes a first parameter that corresponds to a speed at which the popularity increased for the trending content item as compared to other trending content items and a second parameter that corresponds to a number of tweets that reach a certain number in a relatively shorter span of time for the trending content item as compared to other trending content items including when the other trending content items have more tweets than the number of tweets associated with the trending content item.

18. The non-transitory computer readable medium of claim 17, wherein providing the trending content items to the viewing device includes providing the trending content items relating to a particular local area associated with the user.

19. The non-transitory computer readable medium of claim 17, wherein analyzing the trending content items comprises analyzing the trending content items in relation to one or more or combination of time, date, and length of the trending content item.

* * * * *